United States Patent Office 2,947,633
Patented Aug. 2, 1960

2,947,633
TREATMENT OF VEGETABLE BEVERAGES

William M. Perry, Bethlehem, and George G. Stoner, Easton, Pa., assignors to General Aniline & Film Corporation, New York, N.Y., a corporation of Delaware No Drawing. Filed Aug. 29, 1957, Ser. No. 680,931

6 Claims. (Cl. 99—48)

This invention relates to a novel process for removing tannins and tannin complexes, protein-tannin complexes from aqueous solutions containing the same and is particularly concerned with an improved process for clarifying and stabilizing vegetable beverages such as beer, wine, fruit juices, against precipitation caused by presence therein of tannic acid or tannins or by protein-tannin complexes.

In U.S. Patent 2,688,550 of September 7, 1954, to William D. McFarlane, it is disclosed that vegetable beverages of the aforesaid type are subject to the formation of haze or turbidity when stored for long periods at low temperatures. In beer, this is apparently caused by precipitation of protein-tannin complexes, and in wine and fruit juices, by tannic acid or tannins. Such turbidity is commonly called "chill-haze." As disclosed in said McFarlane patent, the addition of a small amount of a water-soluble polymer of vinyl pyrrolidone of the type disclosed in U.S. Patent No. 2,335,454 to Schuster et al. and U.S. Patent 2,265,450 to Reppe et al., results in the formation of a precipitate of the protein-tannin complex of the beer with the polyvinyl pyrrolidone so that after the removal of the resulting precipitate, as by centrifuging or filtering, the tendency of the beer to form chill-haze is eliminated and the flavor and foaming characteristics are improved. Similarly, the addition of a polyvinyl pyrrolidone to wines or fruit juices in an amount about equal to the amount of tannic acid present precipitates the latter and substantially clarifies the wine or fruit juices and eliminates chill-haze tendencies.

In the copending application of D. B. Witwer and J. M. Wilkinson, Serial No. 478,872, filed December 30, 1954, now Patent No. 2,811,449, there is disclosed a method of clarifying and stabilizing vegetable beverages of the type above mentioned which comprises adding to the beverage a water-soluble copolymer of vinyl pyrrolidone and another vinyl monomer such as vinyl acetate.

We have now discovered that if in place of water-soluble polymers of vinyl pyrrolidone as disclosed in the McFarlane patent, or water-soluble copolymers of polyvinyl pyrrolidone as disclosed by Witwer and Wilkinson, there is employed a water-insoluble copolymer of vinyl pyrrolidone; the tannin materials in vegetable beverages will combine or complex with the water-insoluble copolymer of vinyl pyrrolidone, and are thus removed from the solution.

It will be apparent that our discovery that the water-insoluble copolymers of vinyl pyrrolidone, when contacted with an aqueous solution containing tannins, complex or combine with the tannin and thus remove it from the solution, has several improved advantages over the use of water-soluble polymers or copolymers of vinyl pyrrolidone for removing tannins from aqueous solutions, particularly beverages, containing the same. Specifically, it will be noted that by employing water-insoluble copolymers of vinyl pyrrolidone, we are able to remove tannins from aqueous solutions, particularly beverages, containing the same without the possibility of adding any foreign matter to the solution. This is particularly important in the case of beverages and similar food products. It will also be apparent that by employing water-insoluble copolymers of vinyl pyrrolidone, we do not have to exercise careful control over the amount of copolymer employed; since this copolymer is insoluble in the solution or beverage being treated and an excess of this water-insoluble copolymer over that required to complex or combine with the tannins does not tend to cause redissolution of the polymer-tannin complex, as may be the case with the precipitate formed when a water-soluble vinyl pyrrolidone polymer (particularly a homopolymer of vinyl pyrrolidone) is employed to precipitate tannins. It will also be apparent that by employing water-insoluble copolymers of vinyl pyrrolidone, the product formed, when tannin is combined with it, may readily be separated from the liquid being treated; whereas when a water-soluble homo- or copolymer of vinyl pyrrolidone is employed, the precipitate formed at times presents some problems for separating it from the liquid.

In practicing the present invention, the solution containing tannins need merely be contacted with the water-insoluble copolymer of vinyl pyrrolidone. This may be done by adding to the solution to be treated a powder or granules of the water-insoluble copolymer of vinyl pyrrolidone or other finely particulate form of such copolymer. It may also be effected by flowing the solution containing tannins through a bed of powdered or pelleted granular, water-insoluble copolymer of vinyl pyrrolidone in a manner similar to that employed in contacting water with ion exchange resins. If desired, in order to provide a greater surface area, the water-insoluble copolymer of vinyl pyrrolidone may be used as a coating on an inert solid, such as sand, and the solution containing tannins passed through a bed of such coated sand or the coated sand may be added to the solution, preferably with agitation in order to assure good contact, and the coated sand then to be permitted to settle out. Regardless of the particular method employed for contacting the solution containing tannin with the water-insoluble copolymer of vinyl pyrrolidone, we have discovered that the tannins present in the solution combine or complex with the water-insoluble copolymer and are thus removed from the solution.

The water-insoluble copolymers of vinyl pyrrolidone which may be employed in practicing the present invention may be represented by the following general formula

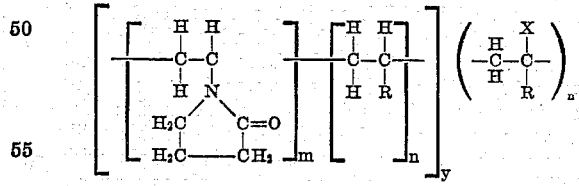

in which R represents the residue of a vinyl or vinylidene monomer such as the phenyl group from styrene, or the carboalkoxy group from acrylate esters, or the nitrile group from acrylonitrile, chlorine from vinyl chloride. While, where R represents a stearoxy group, the copolymer is water-insoluble when the vinyl stearate content of the copolymer is as low as about 20 percent. It has been found that ability of the water-insoluble vinyl pyrrolidone copolymers to complex with tannins varies substantially directly as the vinyl pyrrolidone content of the copolymer. However, copolymers of vinyl pyrrolidone with a wide variety of other polymerizable vinyl compounds in which the vinyl pyrrolidone content of the copolymer was as low as 10 percent were found to be effective for removing tannins from aqueous solutions.

Thus, a copolymer having a vinyl pyrrolidone content of 10 percent and a vinyl acetate content of 90 percent can be used to remove tannins from only about one-third as much of a given solution containing tannins as can a vinyl pyrrolidone-vinyl acetate copolymer having a vinyl pyrrolidone content of about 30 percent and a vinyl acetate content of 70 percent.

It should also be understood that in practicing the present invention, the copolymer need only be water-insoluble at the temperature employed for contact with the solution containing tannins. Thus, a vinyl pyrrolidone-vinyl acetate copolymer having a ratio of vinyl pyrrolidone to vinyl acetate of 58:42 by weight, which is insoluble in water at 20° C. should not be used to treat a solution containing tannins at say, 80° C. where this copolymer is soluble to some extent in the solution.

The details of the present invention will be apparent to those skilled in the art from a consideration of the following specific examples.

*Example I*

To 10 parts of a freshly filtered "Ruh" beer (not pasteurized and not enzyme treated) in a glass container there was added .5 part by weight of copolymer of vinyl pyrrolidone and vinyl stearate having a vinyl pyrrolidone content of 42% and vinyl stearate content of 58%. The mixture was then rolled to insure mixing and after standing for 20 minutes was filtered through a No. 5 Whatman filter paper. The filtering rate was the same as that for beer without copolymer. An aliquot of the original untreated beer was filtered through a No. 5 Whatman filter paper for use as a control. Both samples were bottled and as they came from the filter were clear and sparkling. The bottled samples were then placed in an ice water bath for 45 minutes, at which time the untreated sample had a definite haze, whereas the treated sample remained clear and sparkling.

*Example II*

Freshly filtered "Ruh" beer at room temperature was flowed through a bed of granular copolymer of vinyl pyrrolidone-vinyl stearate having a vinyl pyrrolidone content of 42 percent, a vinyl stearate content of 58 percent at a rate of about 0.25 ml. of beer per gram of copolymer per minute. After passing through this bed of copolymer, the beer was bottled and placed in an ice water bath for 45 minutes, after which it was still clear and sparkling, although a control sample of the same beer which had been merely filtered through a No. 5 Whatman filter paper at storing in an ice water bath for 45 minutes showed a definite haze.

*Example III*

Fifteen ml. of "Ruh" beer (not enzyme treated and not pasteurized) was filtered through a No. 5 Whatman filter paper. After filtering the beer was clear, light yellow, and sparkling. This sample was then submerged into an ice-water bath for 45 minutes. After this time the beer was examined and a definite, easily visible chill-haze or precipitate was observed. This sample with the chill-haze we will call the control sample as a means of identification.

Twenty-six ml. of the same "Ruh" beer was filtered through the same No. 5 Whatman filter paper and a clear, sparkling sample was obtained as stated before in the preceding paragraph.

This sample of freshly-filtered "Ruh" beer was allowed to drop gradually into the top of a 50 ml. burette containing 26 ml. (80 grams) of granular styrene-vinyl pyrrolidone copolymer and which contained 76% by weight 1-vinyl-2-pyrrolidone and 24% by weight of styrene and gave a Fikentscher K value of 26 in 2-butanone. This copolymer was water insoluble. The granular copolymer was supported on a plug of glass wool (about 3 cm. long) in the bottom of the burette. The copolymer was uniform granular size which would pass through a 10 mesh U.S. Standard sieve but be retained on a 20 mesh U.S. Standard sieve. The beer was allowed to drop onto the bed of copolymer and trickle through at the rate of about 1.5 ml. per minute. The beer as it dropped from the exit end of the column was clear, sparkling, and of a lighter yellow color than the clear, sparkling beer fed into the top of the column.

This sample of beer was cooled in an ice-water bath for 45 minutes. The beer remained clear, sparkling and did not develop any haziness.

It would be understood that the vinyl pyrrolidone copolymer employed in the foregoing examples are merely illustrative of the vinyl pyrrolidone copolymers which may be employed in practicing the present invention and in place of these specific copolymers there may be employed any of the following copolymers of 1-vinyl-2-pyrrolidone and methyl acrylate, vinyl chloride, vinylidene chloride, methyl methacrylate, ethyl acrylate, acrylonitrile, and stearyl methacrylate. While the invention has thus far been described in connection with the use of copolymers of vinyl pyrrolidone with one other polymerizable monomer, it will be understood that terpolymers and tetrapolymers and the like may be employed.

We claim:

1. The process for removing tannins, tannic acid and protein-tannin complexes from vegetable beverages, which comprises flowing a beverage containing at least one of the aforesaid compounds through a bed of solid water-insoluble copolymer, in particulate form, said copolymer substantially consisting of N-vinyl-α-pyrrolidone copolymerized with a second copolymerizable vinyl compound, whereby the aforesaid compounds combine with said solid water-insoluble copolymer and withdrawing from said bed said beverage freed of the aforesaid compounds.

2. Process as defined in claim 1 wherein the copolymer consists of N-vinyl pyrrolidone copolymerized with vinyl stearate.

3. The process as defined in claim 1 wherein the copolymer consists of N-vinylpyrrolidone copolymerized with styrene.

4. The process of removing chill-haze producing components from beer, which comprises flowing beer through a bed of solid water-insoluble copolymer, in particulate form, said copolymer substantially consisting of N-vinyl-α-pyrrolidone copolymerized with a second copolymerizable vinyl compound, whereby the aforesaid compounds combine with said solid water-insoluble copolymer and withdrawing from said bed said beverage freed of the aforesaid compounds.

5. The process as defined in claim 4 wherein the copolymer consists of N-vinyl pyrrolidone copolymerized with vinyl stearate.

6. The process as defined in claim 4 wherein the copolymer consists of N-vinylpyrrolidone copolymerized with styrene.

References Cited in the file of this patent

UNITED STATES PATENTS

| | | |
|---|---|---|
| 2,688,550 | McFarlane | Sept. 7, 1954 |
| 2,811,449 | Witwer et al. | Oct. 29, 1957 |

UNITED STATES PATENT OFFICE

CERTIFICATE OF CORRECTION

Patent No. 2,947,633                August 2, 1960

William M. Perry et al.

It is hereby certified that error appears in the above numbered patent requiring correction and that the said Letters Patent should read as corrected below.

Column 2, lines 50 to 55, the right-hand group of the formula

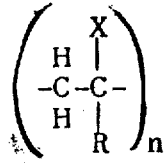

should be cancelled.

Signed and sealed this 14th day of May 1963.

(SEAL)
Attest:

ERNEST W. SWIDER
Attesting Officer

DAVID L. LADD
Commissioner of Patents